(12) United States Patent
Rai et al.

(10) Patent No.: US 9,288,450 B2
(45) Date of Patent: Mar. 15, 2016

(54) METHODS FOR DETECTING AND RECOGNIZING A MOVING OBJECT IN VIDEO AND DEVICES THEREOF

(75) Inventors: Harikrishna G. N. Rai, Bangalore (IN); Rudra Narayana Hota, D-Jajpur (IN); Kishore Jonna, Cuddapah (IN); P. Radha Krishna, Hyderabad (IN)

(73) Assignee: Infosys Limited, Bangalore (IN)

(*) Notice: Subject to any disclaimer, the term of this patent is extended or adjusted under 35 U.S.C. 154(b) by 417 days.

(21) Appl. No.: 13/570,350

(22) Filed: Aug. 9, 2012

(65) Prior Publication Data
US 2013/0044914 A1 Feb. 21, 2013

(30) Foreign Application Priority Data
Aug. 18, 2011 (IN) .......................... 2817/CHE/2011

(51) Int. Cl.
*H04N 7/18* (2006.01)
*G06K 9/32* (2006.01)
*G06Q 30/02* (2012.01)

(52) U.S. Cl.
CPC .............. *H04N 7/181* (2013.01); *G06K 9/3216* (2013.01); *G06Q 30/02* (2013.01)

(58) Field of Classification Search
None
See application file for complete search history.

(56) References Cited

U.S. PATENT DOCUMENTS

| | | | |
|---|---|---|---|
| 5,331,544 A | 7/1994 | Lu et al. | |
| 5,465,115 A | 11/1995 | Conrad et al. | |
| 6,873,710 B1* | 3/2005 | Cohen-Solal et al. | 382/100 |
| 7,596,260 B2* | 9/2009 | Tedesco | G06F 17/30256 348/143 |
| 7,686,217 B2 | 3/2010 | Heckel et al. | |
| 7,688,349 B2 | 3/2010 | Flickner et al. | |
| 7,780,081 B1 | 8/2010 | Liang | |
| 7,796,780 B2 | 9/2010 | Lipton et al. | |
| 7,801,330 B2 | 9/2010 | Zhang et al. | |
| 7,930,204 B1 | 4/2011 | Sharma et al. | |
| 8,666,164 B2* | 3/2014 | Thangam et al. | 382/173 |
| 9,031,858 B2* | 5/2015 | Angell et al. | 705/14.52 |
| 2002/0121547 A1 | 9/2002 | Wieth et al. | |
| 2005/0234771 A1 | 10/2005 | Register et al. | |
| 2007/0282665 A1* | 12/2007 | Buehler | G06Q 30/02 705/7.29 |
| 2008/0018738 A1 | 1/2008 | Lipton et al. | |
| 2008/0159634 A1 | 7/2008 | Sharma et al. | |
| 2008/0177994 A1* | 7/2008 | Mayer | G06F 9/4418 713/2 |
| 2008/0249838 A1 | 10/2008 | Angell et al. | |
| 2009/0083121 A1 | 3/2009 | Angell et al. | |

(Continued)

FOREIGN PATENT DOCUMENTS

WO 2008058296 A2 5/2008

OTHER PUBLICATIONS

Remagnino, P., et al., "Video-Based Surveillance Systems Computer Vision and Distributed Processing," Kluwer Academic Publishers, (2002).

(Continued)

*Primary Examiner* — Nancy Bitar
(74) *Attorney, Agent, or Firm* — LeClairRyan, a Professional Corporation

(57) ABSTRACT

A method, non-transitory computer readable medium, and apparatus that extracts at least one key image from one or more images of an object. Outer boundary markers for an identifier of the object in the at least one key image are detected. An identification sequence from the identifier of the object between the outer boundary markers in the at least one key image is recognized. The recognized identification sequence of the object in the at least one key image is provided.

30 Claims, 5 Drawing Sheets

(56) References Cited

U.S. PATENT DOCUMENTS

| | | | |
|---|---|---|---|
| 2009/0083134 A1* | 3/2009 | Burckart et al. | 705/14 |
| 2009/0192874 A1* | 7/2009 | Powles et al. | 705/10 |
| 2010/0076818 A1 | 3/2010 | Peterson et al. | |
| 2010/0250305 A1 | 9/2010 | Lee et al. | |
| 2011/0137753 A1* | 6/2011 | Moehrle | G06Q 30/02 705/27.1 |
| 2012/0265616 A1* | 10/2012 | Cao | G06Q 30/0261 705/14.58 |

OTHER PUBLICATIONS

Haritaoglu et al., "Detection and Tracking of Shopping Groups in Stores", 2001 IEEE Computer Society Conference on Computer Vision and Pattern Recognition, pp. I-431-I-438 (2001).

Viola et al., "Rapid Object Detection Using a Boosted Cascade of Simple Features", In Proceedings of IEEE Conference on Computer Vision and Pattern Recognition (Kauai, HI, USA, Dec. 8-14, 2001), pp. 1-9 (2001).

Heisele et al., "Hierarchical Classification and Feature Reduction for Fast Face Detection With Support Vector Machines", Pattern Recognition, 36, pp. 2007-2017 (Sep. 2003).

Zhao et al., "A Novel System for Tracking Pedestrians Using Multiple Single-Row Laser-Range Scanners", IEEE Transaction on Systems, Man and Cybernetics, 35:2, pp. 283-291, (2005).

Le et al., "Multi-Stage Approach to Fast Face Detection", IEICE Trans. Inf. & Syst., E89-D(7), pp. 2275-2285 (2006).

Zimmerman, "Tracking Shopping Carts using Mobile Cameras Viewing Ceiling-Mounted Retro-Reflective Bar Codes", IEEE International Conference on Computer Vision Systems (ICVS'06), Jan. 4-7, 2006, pp. 1-8 (2006).

Gavrila et al., "Multi-Cue Pedestrian Detection and Tracking From a Moving Vehicle", International Journal of Computer Vision, 73:1, pp. 41-59 (Jun. 2007).

Leibe et al., Robust Object Detection With Interleaved Categorization and Segmentation, International Journal of Computer Vision, 77:1-3, pp. 1-26 (Aug. 2007).

Girgensohn et al., "Determining Activity Patterns in Retail Spaces through Video Analysis", Proceeding of the 16th ACM international conference on Multimedia, (Vancouver, British Columbia Canada, Oct. 26-31, 2008) pp. 1-4, (2008).

Negri et al., "A Cascade of Boosted Generative and Discriminative Classifiers for Vehicle Detection", EURASIP Journal on Advances in Signal Processing, 2, Article ID 782432, pp. 1-12 (2008).

Sicre et al., "Human Behavior Analysis and Event Recognition at a Point of Sale", 2010 Fourth Pacific-Rim Symposium on Image and Video Technology, pp. 127-137 (2010).

Hampapur et al., "Smart Surveillance: Applications, Technologies and Implications", ICICS-PCM, pp. 1133-1138 (Dec. 2003).

* cited by examiner

METHODS FOR DETECTING AND RECOGNIZING A MOVING OBJECT IN VIDEO AND DEVICES THEREOF

This application claims the benefit of Indian Patent Application Filing No. 2817/CHE/2011, filed Aug. 18, 2011, which is hereby incorporated by reference in its entirety.

FIELD

This technology relates to methods for detecting and recognizing a moving object, such as a shopping cart in a retail environment, in video and devices thereof.

BACKGROUND

Video cameras are commonly used in various industry segments for security, surveillance and tracking purposes. Typically, these video cameras are positioned to capture streams of video frames over substantially all accessible space which is being monitored.

Image and video analytics can be utilized to extract meaningful insights from these captured streams of video frames. Insights derived by the image and video analytics can be used to make decisions and predictions in a variety of different types of applications. One such application is in the retail industry for tracking customer movements in shopping malls.

In shopping malls, there is a need to be able to monitor and track customer response to in-store displays and promotions. Currently, retailers are trying to use a variety of different types of analytic tools to understand buying patterns of customers. By way of example, many retailers analyze data obtained from customer loyalty cards and other programs to determine which stores are being most affected by customers who make inconsistent purchases, jump at coupons, or frequently return products. The data gathered by these analytics help retailers tailor future sales, coupons, and other promotions. Unfortunately, current analytic tools in the retail space are either expensive and/or ineffective.

For example, some existing analytic tools, utilize hardware based solutions, such as Motes, WSN, or RFID, to track customer movement and shelf inventory. In these examples, wireless transmitters are embedded in shopping carts and in overhead sensors positioned throughout the store, capturing reams of new data about how shoppers move through stores, where they stop to linger or compare prices, and how much time they spent in front a display. Unfortunately, these tracking analytics are very expensive to install and maintain.

SUMMARY

A method for detecting and recognizing a moving object in video includes extracting with a tracking management computing device at least one key image from one or more images of an object. Outer boundary markers for an identifier of the object in the at least one key image are detected with the tracking management computing device. An identification sequence from the identifier of the object between the outer boundary markers in the at least one key image is recognized with the tracking management computing device. The recognized identification sequence of the object in the at least one key image is provided with the tracking management computing device.

A non-transitory computer readable medium having stored thereon instructions for detecting and recognizing a moving object in video comprising machine executable code which when executed by at least one processor, causes the processor to perform steps including extracting at least one key image from one or more images of an object. Outer boundary markers for an identifier of the object in the at least one key image are detected. An identification sequence from the identifier of the object between the outer boundary markers in the at least one key image is recognized. The recognized identification sequence of the object in the at least one key image is provided.

A tracking management computing device includes a memory coupled to one or more processors which are configured to execute programmed instructions stored in the memory including extracting at least one key image from one or more images of an object. Outer boundary markers for an identifier of the object in the at least one key image are detected. An identification sequence from the identifier of the object between the outer boundary markers in the at least one key image is recognized. The recognized identification sequence of the object in the at least one key image is provided.

This technology provides a number of advantages including providing methods and devices for more efficiently and cost effectively detecting and recognizing a moving object in video or other sets of images. With this technology, consumer movement in a retail environment can be captured in an efficient and more cost effective manner. In particular, this technology is less expensive and requires less maintenance than prior hardware based systems because for example there are no transmitters or batteries required for each cart and also as a result less need for maintenance service. Additionally, this technology is highly scalable because only video cameras may need to be procured and installed for increasing the coverage. Further, this technology is highly versatile and with the existing video camera set ups can be used for surveillance and tracking of other objects, such as people. With this technology, the resulting captured movement can be utilized to tailor future sales, coupons, promotions, and displays for the particular retail environment.

DETAILED DESCRIPTION

Figure 1:
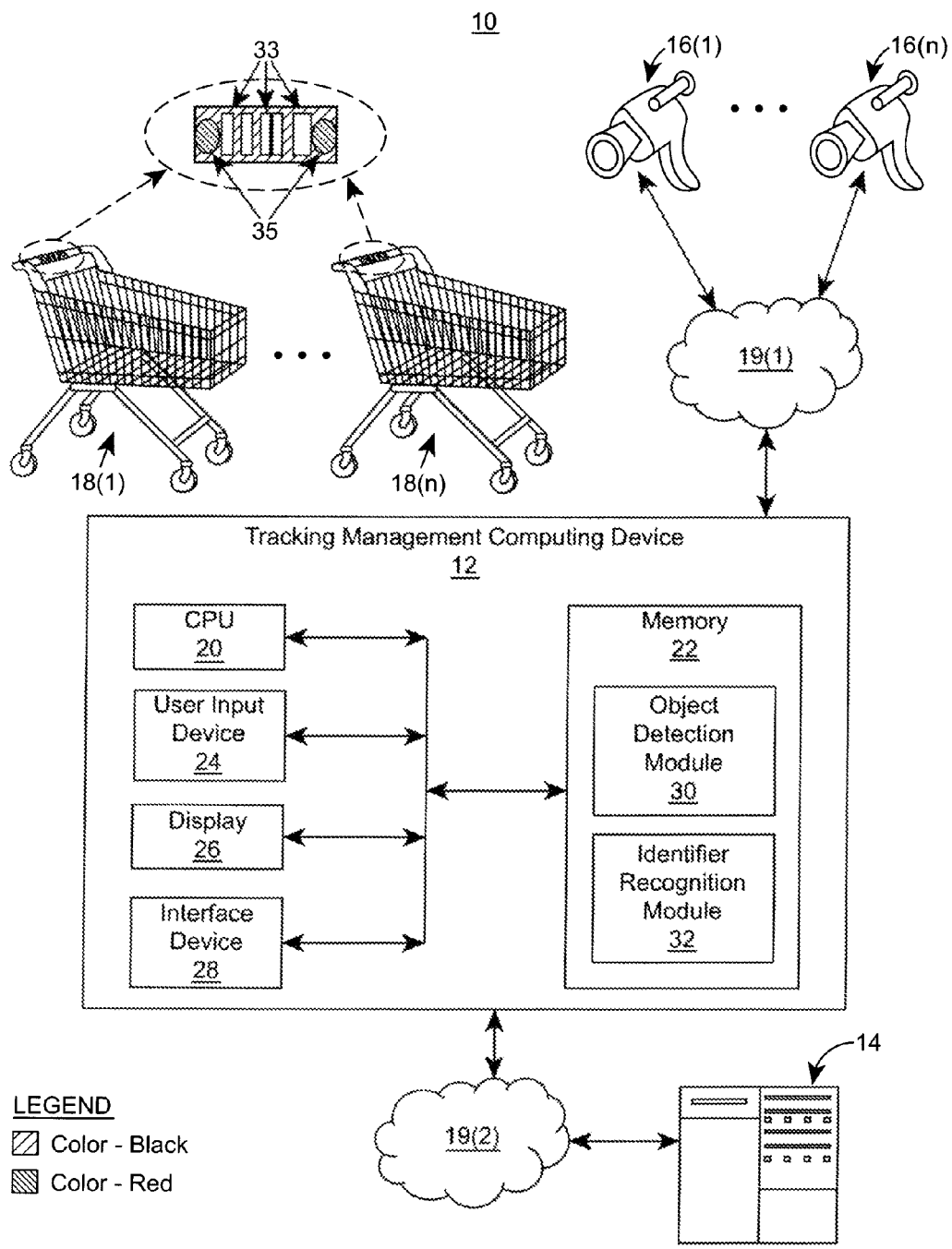
FIG. 1 is an environment with an exemplary content management computing device.

An environment 10 with an exemplary tracking management computing device 12 is illustrated in FIG. 1. The environment 10 includes the tracking management computing device 12, consumer identification server 14, and video cameras 16(1)-16(n) which are all coupled together by one or more communication networks 19(1)-19(2) to track one or more shopping carts 18(1)-18(n), although this environment can include other types and numbers of systems, devices, components, and elements in other configurations which are used to track other types and numbers of objects. This technology provides a number of advantages including providing methods and devices for more efficiently and cost effectively detecting and recognizing a moving object in video or other sets of images.

The tracking management computing device 12 includes a central processing unit (CPU) or processor 20, a memory 22, a user input device 24, a display 26, and an interface device 28 which are coupled together by a bus or other link, although other numbers and types of systems, devices, components, and elements in other configurations and locations can be used. The processor 20 in the tracking management computing device 12 executes a program of stored instructions for one or more aspects of the present technology as described and illustrated by way of the examples herein, although other types and numbers of processing devices and logic could be used and the processor could execute other numbers and types of programmed instructions.

The memory 22 in the tracking management computing device 12 stores these programmed instructions for one or more aspects of the present technology as described and illustrated herein, although some or all of the programmed instructions could be stored and executed elsewhere. A variety of different types of memory storage devices, such as a random access memory (RAM) or a read only memory (ROM) in the system or a floppy disk, hard disk, CD ROM, DVD ROM, or other computer readable medium which is read from and written to by a magnetic, optical, or other reading and writing system that is coupled to the processor 20, can be used for the memory 22. In this particular example, the memory 22 includes an object detection module 30 with programmed instructions as illustrated and described with reference to FIG. 2 and an identifier recognition module 32 with programmed instructions as illustrated and described with reference to FIG. 3, although memory 22 can have other types and numbers of modules which execute other types and numbers of functions.

The user input device 24 in the tracking management computing device 12 is used to input data and/or selections, although the user input device could be used to input other types of requests and data and interact with other elements. The user input device 24 can include keypads, touch screens, and/or vocal input processing systems although other types and numbers of user input devices can be used. The display 26 in the tracking management computing device 12 is a computer monitor, although other types and numbers of displays could be used.

The interface device 28 in the tracking management computing device 12 is used to operatively couple and communicate between the tracking management computing device 12 and the consumer identification server 14 and the video cameras 16(1)-16(n), via one or more of the communications networks, although other types and numbers of communication networks or systems with other types and numbers of connections and configurations can be used. By way of example only, the communications network could use TCP/IP over Ethernet and industry-standard protocols, including NFS, CIFS, SOAP, XML, LDAP, and SNMP, although other types and numbers of communication networks, such as a direct connection, a local area network, a wide area network, a personal area network, such as Bluetooth, modems and phone lines, e-mail, and wireless communication technology, each having their own communications protocols, can be used.

The consumer identification server 14 includes a central processing unit (CPU) or processor, a memory, and an interface device or I/O system, which are coupled together by a bus or other link, although other numbers and types of network devices could be used. In this example, the consumer identification server 14 has a number of functions including enrolling and assigning a unique identifier to a consumer of a retail establishment as well as capturing other consumer background information which can be utilized with the captured tracking data, although other types and numbers of functions can be implemented. Additionally, other numbers and types of consumer identification servers can be used.

In this particular example, each of the video cameras 16(1)-16(n) comprises a video camera, although other types and numbers of image capture devices could be used and the images could be retrieved from a stored database. The video cameras are positioned throughout the area to be monitored to capture a stream of video frames, although other manners and devices for capturing images could be used.

The shopping carts 18(1)-18(n) include a bar code identifier comprising a binary bit pattern 33 encoded in black and white bars in a strip bounded on each end by a pair of outer boundary markers 35 which in this example are in color and have a circular shape, although other types of identifiers and other types of outer boundary markers with other colors and shapes on other types of objects can be used. By of example only, in the first captured image in FIG. 4 a bar code identifier between a pair of outer boundary markers is located on the handle of the shopping cart. In another example, in the first and second captured images shown in FIG. 5 a bar code identifier between a pair of red circular outer boundary markers is located on a movable chair, although this technology can be used to track other types of objects. Additional illustrative and non-limiting examples include using this technology to track movement of heavy goods carried over a material handling trolley or conveyor belt in store rooms.

Although examples of the tracking management computing device 12, consumer identification server 14, and video cameras 16(1)-16(n) coupled together via one or more communication networks 19(1)-19(2) are illustrated and described herein, each of these systems can be implemented on any suitable computer system or computing device. It is to be understood that the devices and systems of the examples described herein are for exemplary purposes, as many variations of the specific hardware and software used to implement the examples are possible, as will be appreciated by those skilled in the relevant art(s).

Furthermore, each of the systems of the examples may be conveniently implemented using one or more general purpose computer systems, microprocessors, digital signal processors, and micro-controllers, programmed according to the teachings of the examples, as described and illustrated herein, and as will be appreciated by those ordinary skill in the art.

In addition, two or more computing systems or devices can be substituted for any one of the systems in any embodiment of the examples. Accordingly, principles and advantages of distributed processing, such as redundancy and replication also can be implemented, as desired, to increase the robustness and performance of the devices and systems of the examples. The examples may also be implemented on computer device or devices that extend across any suitable network using any suitable interface mechanisms and communications technologies, including by way of example only telecommunications in any suitable form (e.g., voice and modem), wireless communications media, wireless communications networks, cellular communications networks, 3G communications networks, Public Switched Telephone Network (PSTNs), Packet Data Networks (PDNs), the Internet, intranets, and combinations thereof.

The examples may also be embodied as a non-transitory computer readable medium having instructions stored thereon for one or more aspects of the present technology as described and illustrated by way of the examples herein, as described herein, which when executed by a processor, cause the processor to carry out the steps necessary to implement the methods of the examples, as described and illustrated herein.

Figure 2:
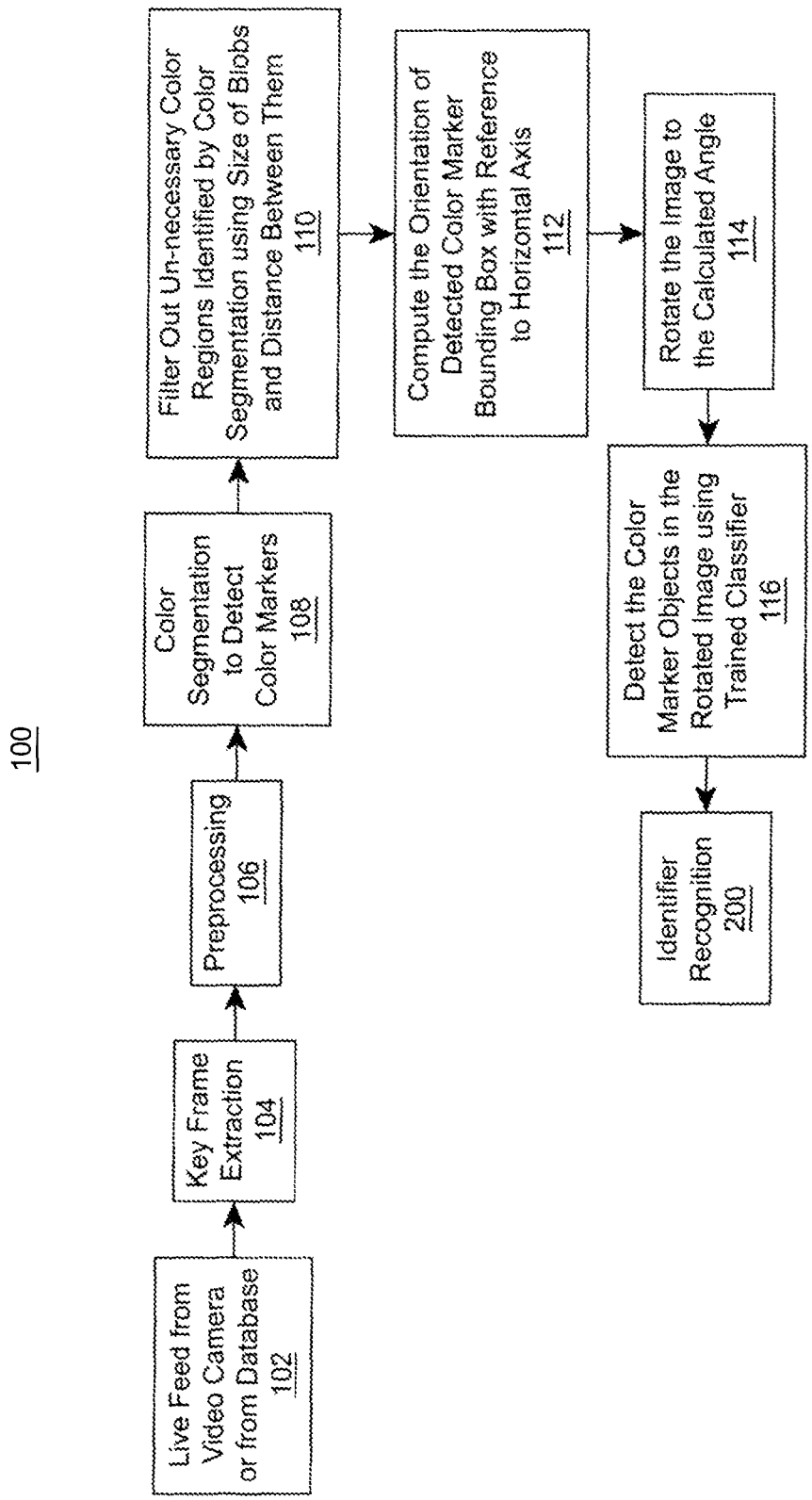
FIG. 2 is a flow chart of an exemplary method for detecting a moving object in video.
Figure 3:
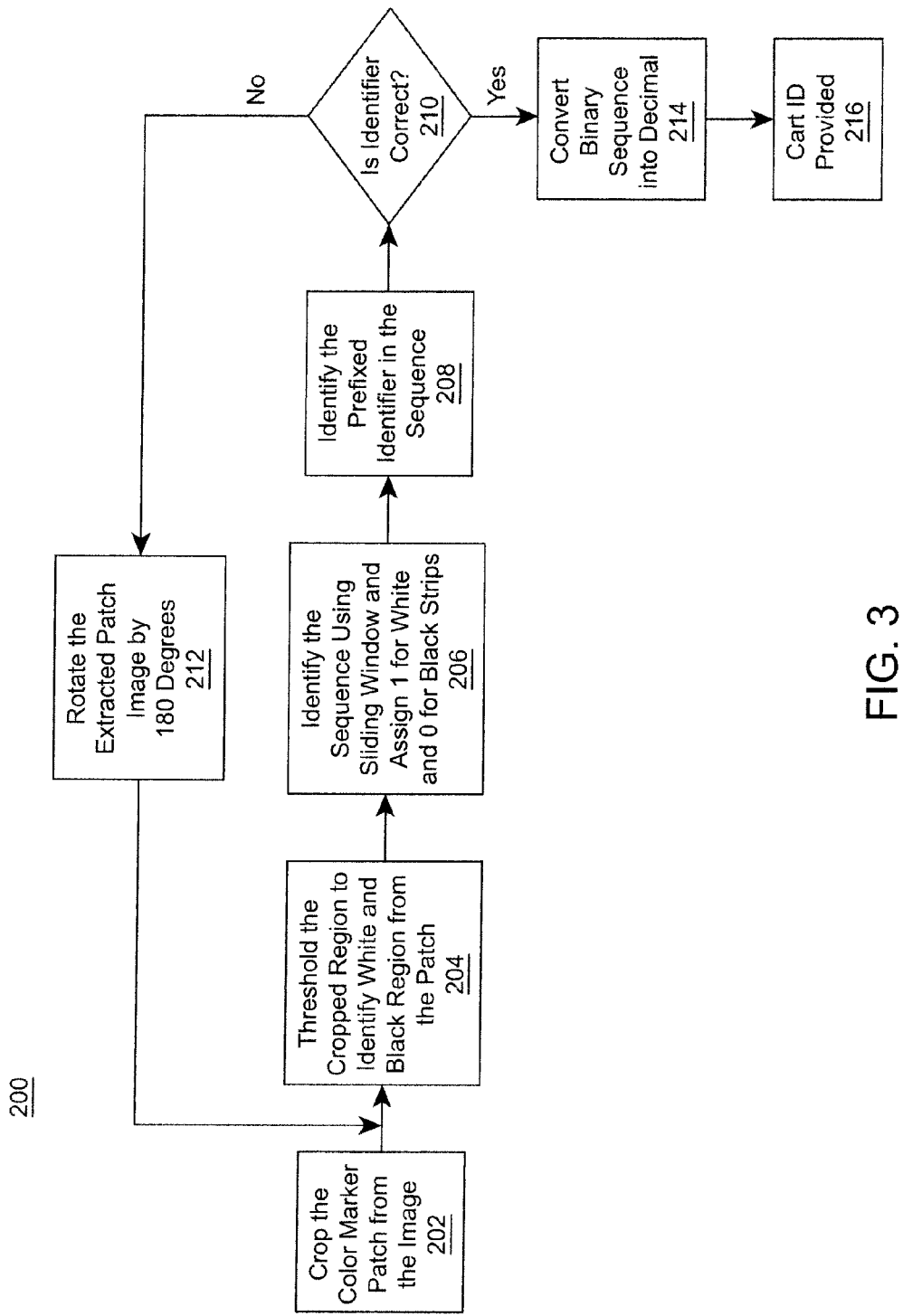
FIG. 3 is a flow chart of an exemplary method for recognizing the moving object in the video.
Figure 4:
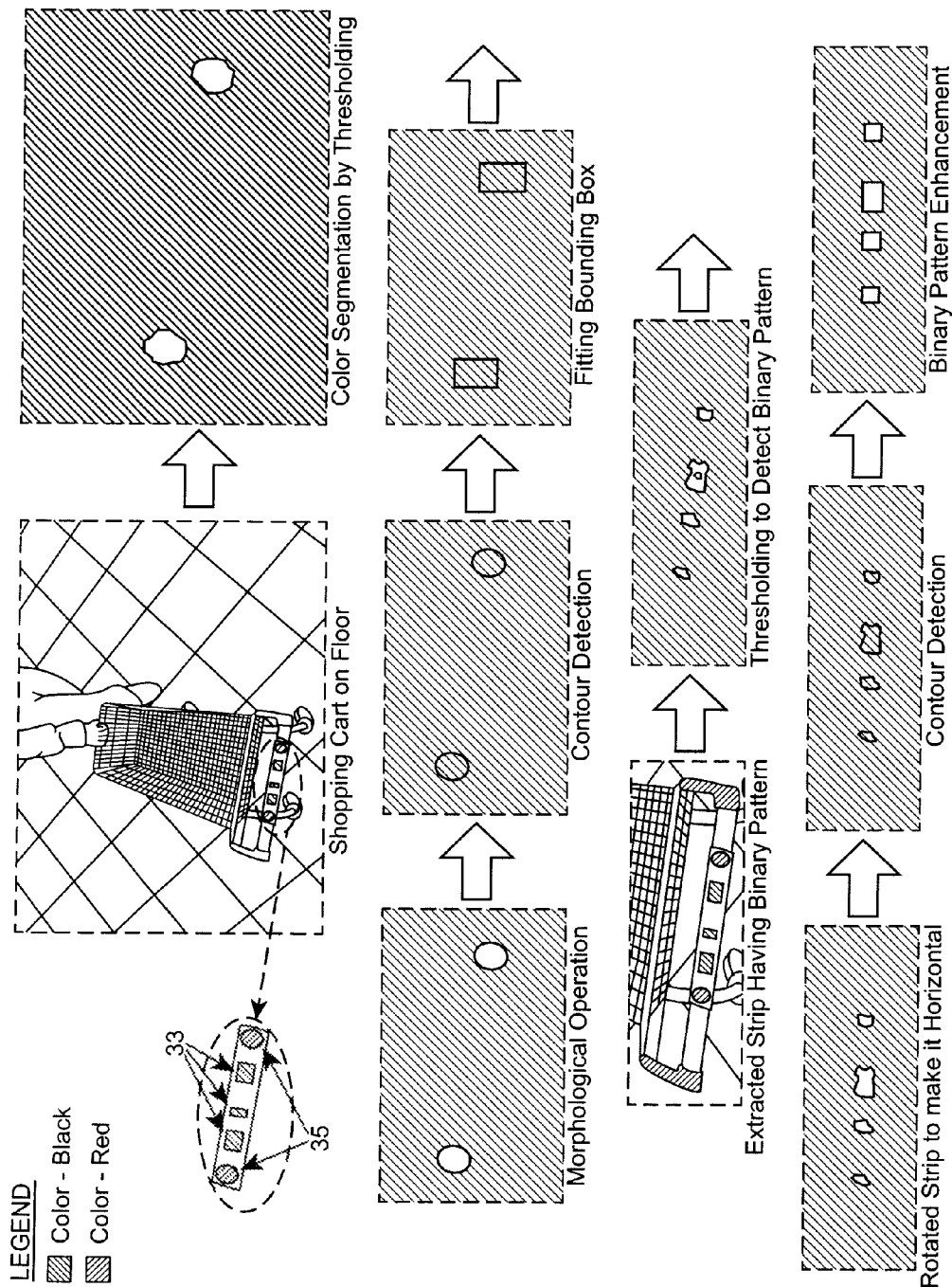
FIG. 4 are exemplary captured images of an identifier on a shopping cart during various stages of detection and recognition.
Figure 5:
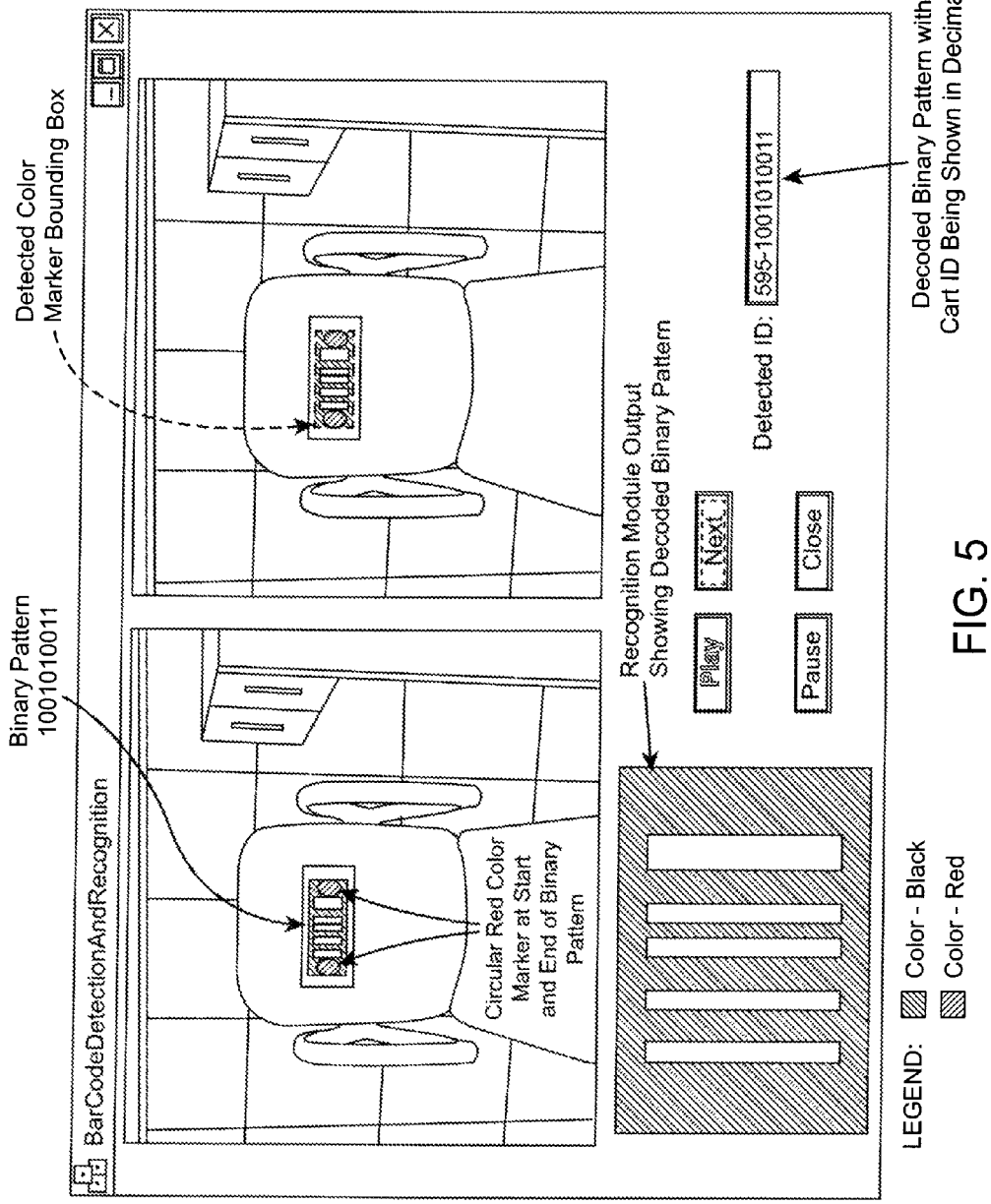
FIG. 5 are exemplary captured images of an identifier on a chair and a screen shot of the recognized identifier.

An exemplary method 100 for detecting a moving object in video will now be described with reference to FIGS. 1, 2, and 4. In step 102, video frames are captured by a plurality of video cameras 16(1)-16(n) positioned around an area, such as a retail shopping space by way of example only, and are provided to the tracking management computing device 12 in real time, although the video frames or other images can be obtained from other sources, such as a stored database in storage server. In this particular example, the moving objects being tracked are shopping carts 18(1)-18(n) (also illustrated in FIG. 4), although other types of objects could be tracked, such as a chair as illustrated in FIG. 5 or a person by way of example only. Additional illustrative and non-limiting examples include using this technology to track movement of heavy goods carried over a material handling trolley or conveyor belt in store rooms.

In step 104, the tracking management computing device 12 selects or otherwise extracts from a set of the obtained images one or more key images by eliminating images having substantially redundant images of the one of the one or more shopping carts 18(1)-18(n) being tracked, although other manners for reducing the obtained set of images to extract the key image at different locations and times throughout the retail space can be used.

In step 106, the tracking management computing device 12 optionally preprocesses the selected key image to eliminate noise and improve the quality of the key image, although other types and numbers of image adjustment, enhancement, or other preprocessing could be conducted.

In step 108, the tracking management computing device 12 detects and identifies the position of potential color outer boundary markers using a color segmentation technique, although other manners for detecting and identifying the position of potential color outer boundary markers can be used. In this particular example, the tracking management computing device 12 is populated with threshold values for the start and end range of color values corresponding to the selected outer boundary markers and which are used in the color segmentation process to detect and identify the potential color outer boundary markers.

In step 110, the tracking management computing device 12 filters out unnecessary color areas identified as potential outer boundary markers by color segmentation using a determined size of each identified color area and also a distance between them, although other manners for filtering can be used. More specifically, the tracking management computing device 12 may filter out one or more color areas detected as potential outer boundary markers which are either too small or too large and/or ones which are either too close together or too far apart from other color areas based on stored threshold values or ranges corresponding to the size and spacing of the outer boundary markers which are being utilized. An example of this is illustrated in the second image at the top of FIG. 4.

In step 112, the tracking management computing device 12 generates a bounding box around the remaining identified potential outer boundary markers and then computes an orientation angle of each of the generated bounding boxes with respect to a stored fixed axis, although other manners for determining the orientation could be used. In this particular example, the tracking management computing device 12 uses spatial pixel manipulation techniques to identify the pixel co-ordinates of the areas or blobs detected as the potential outer boundary markers using the color segmentation described above, connects center points of these detected areas or blobs using a straight line, and then measures an orientation of this center line with respect to the fixed axis, such as a horizontal reference axis, for each to obtain a calculated angle of rotation. An example of generating the bounding box around the remaining identified potential outer boundary markers in a key image is illustrated in the three images on the second row of FIG. 4.

In step 114, the tracking management computing device 12 rotates the area with the identified outer boundary markers based on the calculated angle of rotation with respect to the center of the pair of bounding boxes created by the color segmentation, although other manners for adjusting and processing this area could be used.

In step 116, the tracking management computing device 12 uses a trained classifier to detect and qualify which of the potential outer boundary markers are the outer boundary markers for the identifier of one of the shopping carts 18(1)-18(n) in the key image in this example. To create the trained classifier in the tracking management computing device, features, such as Histogram of Oriented Gradient (HOG), Gabor and Haralick features, can be used with Support Vector Machines (SVM). To generate the trained classifier, the tracking management computing device 12 uses a training process with the classifier involving feature extraction from a set of positive and negative images. The positive image will be known by the tracking management computing device 12 to have all categories of targeted marker segments which were selected while the negative image will not have any of the selected targeted marker segments and this can be used to train the classifier. Once the outer boundary markers for the identifier of one of the shopping carts 18(1)-18(n) in the key image are identified, they are passed on to recognition module 200.

An exemplary method 200 for recognizing the moving object in the video will now be described with reference to FIGS. 1,2, and 4. In step 202, the tracking management computing device 12 crops the identified outer boundary markers from the area of the key image, although other manners for processing this area can be used.

In step 204 the tracking management computing device 12 applies thresholding to the area of the key image where the outer boundary markers were just cropped to identify the white and black portions which comprise the bar code sequence, although other manners for identifying these white and black portions could be used. In this step the tracking management computing device 12 also may optionally resize this thresholded area to a set size, such as 180×60 by way of example only, before proceeding to identify the bar code sequence or perform other dynamic thresholding.

In step 206, the tracking management computing device 12 uses a sliding window to identify the bar code sequence in the thresholded area assigning a value of one for each white area and a zero for each black area, although other manners for identifying the sequence could be used and other types of values could be assigned. An example of the bar code is illustrated in the bottom figure on the right in FIG. 4 and also in another example in the lower left corner of FIG. 5. In step 208, the tracking management computing device 12 identifies the prefixed identifier in the bar code sequence based on the sliding window identification.

In step 210, the tracking management computing device 12 determines whether the prefixed identifier is correct or valid. If in step 210 the tracking management computing device 12 determines the prefixed identifier is incorrect or invalid, then the No branch is taken to step 212. In step 212, the tracking management computing device 12 rotates the thresholded area 180 degrees and then returns to step 204 as described earlier.

If in step 210 the tracking management computing device 12 determines the prefixed identifier is correct or valid, then the Yes branch is taken to step 214. In step 214, the tracking management computing device 12 converts the determined binary sequence from the bar code of the identifier into a decimal number.

In step 216, the determined decimal number of the one of the shopping carts 18(1)-18(n) one is provided by the tracking management computing device 12, such as in the display 26 or to the consumer identification server 14. More specifically, the determined decimal number of the one of the shopping carts 18(1)-18(n) could be provided to the consumer identification server 14 which can associate this number with a particular consumer identification number assigned to the one of the shopping carts 18(1)-18(n) for that particular visit. The tracking management computing device 12 could then output the different locations and times the cart and the associated customer was at different areas in the store which could be used to analyze marketing behavior and provide targeted marketing to the identified consumer.

Accordingly, as illustrated and described with the example herein this technology provides methods and devices for more efficiently and cost effectively detecting and recognizing a moving object in video or other set of images

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for detecting and recognizing a moving object in video, the method comprising:
   extracting, by a tracking management computing device, at least one key image from one or more images of an object;
   detecting, by the tracking management computing device, one or more potential boundary markers for an identifier of the object in the at least one key image;
   determining, by the tracking management computing device, a size of each of the one or more potential boundary markers based on color segmentation of the at least one key image;
   filtering out, by the tracking management computing device, each of the one or more potential boundary markers with a determined size that is outside a threshold size range, wherein the one or more potential boundary markers that were not filtered out comprise outer boundary markers;
   recognizing, by the tracking management computing device, an identification sequence from the identifier of the object between the outer boundary markers in the at least one key image; and
   providing, by the tracking management computing device, the recognized identification sequence of the object in the at least one key image.

2. The method as set forth in claim 1, wherein the detecting the one or more potential boundary markers further comprises:
   filtering out, by the tracking management computing device, the one or more potential boundary markers in the at least one key image based on a distance between the one or more potential boundary markers.

3. The method as set forth in claim 1, wherein the detecting further comprises:
   adjusting, by the tracking management computing device, an orientation of the one or more potential boundary markers in the at least one key image with respect to a fixed axis.

4. The method as set forth in claim 3, wherein the adjusting further comprises:
   generating, by the tracking management computing device, a bounding box around the one or more potential boundary markers;
   computing, by the tracking management computing device, the orientation of the generated bounding box with respect to the fixed axis; and
   rotating, by the tracking management computing device, the at least one key image based on the computed orientation.

5. The method as set forth in claim 1, wherein the identifying further comprises:
   cropping, by the tracking management computing device, the outer boundary markers from a region in the at least one key image before the identifying.

6. The method as set forth in claim 5, wherein the identifying further comprises:
   thresholding, by the tracking management computing device, the cropped region to identify one or more white areas and one or more black areas.

7. The method as set forth in claim 6, wherein the identifying further comprises
   assigning, by the tracking management computing device, based on a sliding window, one value to the one or more identified white areas and another value to the one or more identified black areas.

8. The method as set forth in claim 7, wherein the identifying further comprises:
   determining, by the traffic management computing device, when the identified identification sequence from the identifier of the object between the outer boundary markers in the at least one key image is correct, wherein the cropped region is rotated 180 degrees and the identifying is repeated when the determined identification sequence is incorrect.

9. The method as set forth in claim 8, wherein the identifying further comprises:
   converting, by the tracking management computing device, the identification sequence into a decimal number for the providing the identified identification sequence.

10. A non-transitory computer readable medium having stored thereon instructions for detecting and recognizing a moving object in video comprising machine executable code which when executed by at least one processor, causes the processor to perform steps comprising:
    extracting at least one key image from one or more images of an object;
    detecting one or more potential boundary markers for an identifier of the object in the at least one key image;
    determining a size of each of the one or more potential boundary markers based on color segmentation of the at least one key image;

filtering out each of the one or more potential boundary markers with a determined size that is outside a threshold size range, wherein the one or more potential boundary markers that were not filtered out comprise outer boundary markers;

recognizing an identification sequence from the identifier of the object between the outer boundary markers in the at least one key image; and providing the recognized identification sequence of the object in the at least one key image.

11. The medium as set forth in claim 10, wherein the detecting the one or more potential boundary markers further comprises:

filtering the one or more potential boundary markers in the at least one key image based on a distance between the one or more potential boundary markers.

12. The medium as set forth in claim 10, wherein the detecting further comprises:

adjusting an orientation of the one or more potential boundary markers in the at least one key image with respect to a fixed axis.

13. The medium as set forth in claim 12, wherein the adjusting further comprises:

generating a bounding box around the one or more potential boundary markers;

computing the orientation of the generated bounding box with respect to the fixed axis; and rotating the at least one key image based on the computed orientation.

14. The medium as set forth in claim 10, wherein the identifying further comprises:

cropping the outer boundary markers from a region in the at least one key image before the identifying.

15. The medium as set forth in claim 14, wherein the identifying further comprises:

thresholding the cropped region to identify one or more white areas and one or more black areas.

16. The medium as set forth in claim 15, wherein the identifying further comprises:

assigning, based on a sliding window, one value to the one or more identified white areas and another value to the one or more identified black areas.

17. The medium as set forth in claim 16, wherein the identifying further comprises:

determining when the identified identification sequence from the identifier of the object between the outer boundary markers in the at least one key image is correct, wherein the cropped region is rotated 180 degrees and the identifying is repeated when the determined identification sequence is incorrect.

18. The medium as set forth in claim 17, wherein the identifying further comprises:

converting the identification sequence into a decimal number for the providing the identified identification sequence.

19. A tracking management computing device comprising:
one or more processors;
a memory coupled to the one or more processors which are configured to be capable of executing programmed instructions comprising and stored in the memory to:
extract at least one key image from one or more images of an object;
detect one or more potential boundary markers for an identifier of the object in the at least one key image;
determine a size of each of the one or more potential boundary markers based on color segmentation of the at least one key image;

filter out each of the one or more potential boundary markers with a determined size that is outside a threshold size range, wherein the one or more potential boundary markers that were not filtered out comprise outer boundary markers;

recognize an identification sequence from the identifier of the object between the outer boundary markers in the at least one key image; and provide the recognized identification sequence of the object in the at least one key image.

20. The device as set forth in claim 19, wherein the one or more processors is further configured to be capable of executing programmed instructions for the detecting the outer boundary markers comprising and stored in the memory to:

filter the one or more potential boundary markers in the at least one key image based on a distance between the one or more potential boundary markers.

21. The device as set forth in claim 19, wherein the one or more processors is further configured to be capable of executing programmed instructions for the detecting comprising and stored in the memory to:

adjust an orientation of the one or more potential boundary markers in the at least one key image with respect to a fixed axis.

22. The device as set forth in claim 21, wherein the one or more processors is further configured to be capable of executing programmed instructions for the adjusting comprising and stored in the memory to:

generate a bounding box around the one or more potential boundary markers;

computer the orientation of the generated bounding box with respect to the fixed axis; and rotating the at least one key image based on the computed orientation.

23. The device as set forth in claim 19, wherein the one or more processors is further configured to be capable of executing programmed instructions for the identifying comprising and stored in the memory to:

crop the outer boundary markers from a region in the at least one key image before the identifying.

24. The device as set forth in claim 23, wherein the one or more processors is further configured to be capable of executing programmed instructions for the identifying comprising and stored in the memory to:

threshold the cropped region to identify one or more white areas and one or more black areas.

25. The device as set forth in claim 24, wherein the one or more processors is further configured to be capable of executing programmed instructions for the identifying further comprising and stored in the memory to:

assign, based on a sliding window, one value to the one or more identified white areas and another value to the one or more identified black areas.

26. The device as set forth in claim 25, wherein the one or more processors is further configured to be capable of executing programmed instructions for the identifying comprising and stored in the memory to:

determine when the identified identification sequence from the identifier of the object between the outer boundary markers in the at least one key image is correct, wherein the cropped region is rotated 180 degrees and the identifying is repeated when the determined identification sequence is incorrect.

27. The device as set forth in claim 26, wherein the one or more processors is further configured to be capable of executing programmed instructions stored in the memory for the identifying comprising and stored in the memory to:

convert the identification sequence into a decimal number for the providing the identified identification sequence.

28. The device as set forth in claim 22, wherein the bounding box is generated based on spatial pixel manipulation of the one or more potential boundary markers.

29. The method as set forth in claim 4, wherein the bounding box is generated based on spatial pixel manipulation of the one or more potential boundary markers.

30. The medium as set forth in claim 13, wherein the bounding box is generated based on spatial pixel manipulation of the one or more potential boundary markers.

* * * * *